United States Patent [19]

Lewis

[11] Patent Number: 5,847,555
[45] Date of Patent: Dec. 8, 1998

[54] SOURCE VOLTAGE SENSITIVE LOAD CONTROLLER

[76] Inventor: Dennis E. Lewis, 22 Berkshire Cir., Ware, Mass. 01082

[21] Appl. No.: 874,778

[22] Filed: Jun. 13, 1997

Related U.S. Application Data

[63] Continuation of Ser. No. 510,044, Aug. 1, 1995, abandoned.
[51] Int. Cl.⁶ ............................... G05F 1/10; G05F 1/12; G05F 5/00
[52] U.S. Cl. .......................... 323/299; 323/235; 323/244
[58] Field of Search ..................... 323/299, 300, 323/235, 237, 244, 242

[56] References Cited

U.S. PATENT DOCUMENTS

| Re. 33,184 | 3/1990 | Westfall et al. . | |
|---|---|---|---|
| 4,528,494 | 7/1985 | Bloomer | 323/237 |
| 4,580,088 | 4/1986 | Bloomer . | |
| 4,596,947 | 6/1986 | Alder et al. . | |
| 4,672,301 | 6/1987 | Westfall et al. . | |
| 4,743,834 | 5/1988 | Rice . | |
| 5,004,969 | 4/1991 | Schanin | 323/235 |
| 5,239,255 | 8/1993 | Schanin et al. | 323/237 |
| 5,268,631 | 12/1993 | Gorman et al. . | |
| 5,329,223 | 7/1994 | Riggio | 323/300 |
| 5,349,522 | 9/1994 | Konishi et al. . | |
| 5,373,227 | 12/1994 | Keeth | 323/299 |

*Primary Examiner*—Peter S. Wong
*Assistant Examiner*—Bao Q. Vu
*Attorney, Agent, or Firm*—McCormick, Paulding & Huber

[57] ABSTRACT

An apparatus and method is provided for controlling electrical power from a power source to electrical loads in response to a decrease in power source voltage. A power source signal is compared to a predetermined signal voltage to determine whether and how much the voltage of the power source signal has decreased below that of a predetermined signal. A fraction of electrical power from the power source is transmitted to the loads as a function of how much the voltage of the power source signal has decreased below that of the predetermined signal.

15 Claims, 13 Drawing Sheets

SOURCE VOLTAGE SENSITIVE LOAD CONTROLLER

This is a continuation of application Ser. No. 08/510.044 filed on Aug. 1, 1995 now abandoned.

FIELD OF THE INVENTION

The present invention relates to apparatus and method for controlling power to circuit loads, and more particularly, to automatically controlling power to changing circuit loads.

BACKGROUND

Controllers are used routinely for regulating power to changing circuit loads from a power source of limited capacity, such as a generator or power line. A drawback with such power lines is that as the load increases, the impedance and voltage drop across the line also increases, thereby wasting power and reducing the line voltage available for the loads. For example, starting an induction motor generally causes the line voltage to drop and is usually observed as a dimming of lights that may be served by the same branch circuit as the motor. With a generator powering the circuit, the load may get large enough to drag the voltage below a level at which the motor can be started or to cause an automatic cutout device to activate, thus taking the generator "off line" for all loads connected to it, or triggering an overcurrent or thermal protection device resulting in the motor, or the motor and the branch circuit being taken "off line". The motor may or may not attempt an automatic restart depending on the type of thermal overload protection, but a branch circuit overcurrent device generally requires a manual reset.

"Soft starters" are well known controllers for direct current motors and three phase induction motors to alleviate the problems with motor start-up. For example, one class of soft starters are programmed by the user to bring the motor up to speed in a predetermined time interval. These soft starters generally ramp or raise the voltage to the motor during the start, thereby limiting the inrush current to the motor and preventing excessive voltage drop and power loss across the power lines. Unfortunately, these soft start controllers have several drawbacks. One drawback is that such controllers ignore the effect of the power requirements of other connected loads which may continually change. Another drawback is that although the inrush current to a motor load can be suppressed to some extent, the starting current and its duration are dependent on uncontrolled factors such as the type of motor and other load conditions that exist on the motor at start-up.

It is an object of the present invention to overcome the drawbacks and disadvantages of prior art apparatus and methods for controlling power to circuit loads.

SUMMARY OF THE INVENTION

The present invention is directed to an apparatus for controlling electrical power to one or more loads. The apparatus comprises means for comparing a power source signal voltage to a predetermined signal voltage and determining whether and how much the voltage of the power source signal has decreased below that of the predetermined signal, and means for transmitting a fraction of electrical power from the power source to one or more loads as a function of how much the voltage of the power source signal has decreased below that of the predetermined signal.

The present invention is also directed to a method for controlling electrical power to one or more loads. A differential signal voltage is generated and is indicative of a decrease in a power source signal voltage below that of a predetermined signal voltage. The differential signal voltage increases in response to a decrease in the power source signal voltage below that of the predetermined signal voltage. A fraction of electrical power from the power source is transmitted to one or more loads as a function of the differential voltage. The fraction of power to be transmitted decreases as the power source signal voltage decreases below that of the predetermined signal.

An advantage of the present invention is using the source voltage for automatically controlling power to the load because the source voltage responds quickly to changes in load.

Another advantage is that the present invention permits maximization of the branch circuit capacity and the associated power source such as a generator or inverter. Instead of providing a generator or inverter that is too large simply to provide for starting current, or rewiring a branch circuit, the present invention allows the generator or inverter to be sized more closely to the running current of motors and the power requirements of resistive loads.

A further advantage of the present invention is that it does not require someone to monitor starting of loads. Connected loads such as compressors, on-pressure switches, pumps-on float switches and the like are handled automatically either by being directly connected to a controller embodying the invention or directly connected to a power source with other connected loads supplied through the controller.

Other advantages of the present invention will become apparent in view of the following detailed description and accompanying drawings.

DETAILED DESCRIPTION OF THE PREFERRED EMBODIMENT

Figure 1:
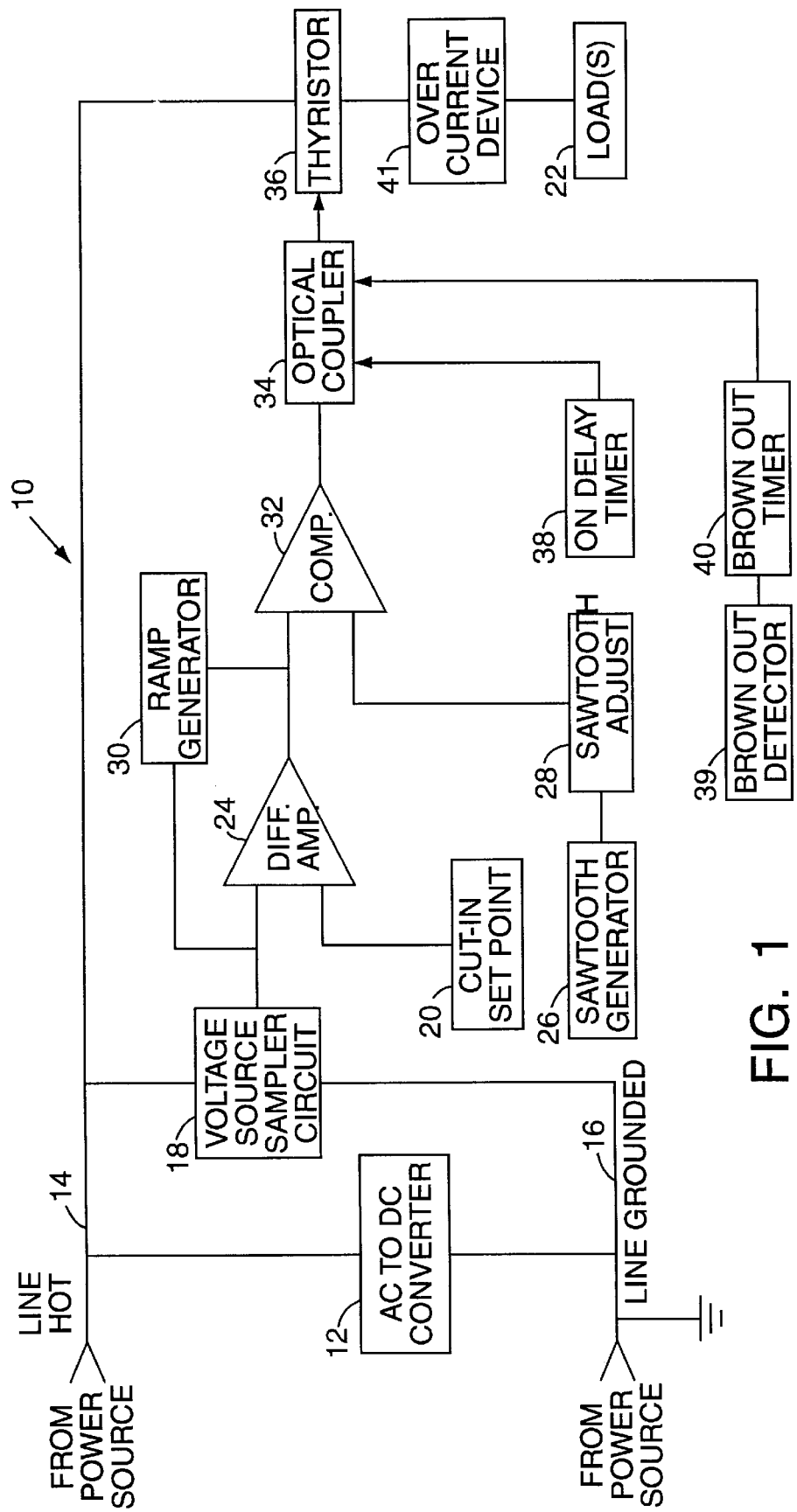
FIG. 1 is a block diagram illustrating the components of a circuit embodying the present invention for automatically controlling power to loads in response to the source voltage.

In FIG. 1, a block diagram of a load controller circuit featuring an embodiment of the present invention for automatically controlling electrical power to loads in response to a power source signal voltage is indicated generally by the reference numeral 10. The function of each of the block circuit components in FIG. 1 will be explained briefly before turning to a more detailed description of each block component in FIG. 2.

With reference to FIG. 1, the controller may include or be separately connected to an AC to DC converter 12 or other suitable source for producing a pulsed DC input signal voltage which is reduced in magnitude from the power source signal. Preferably the DC input signal is a periodic pulsating DC signal having an average voltage greater than zero. The converter preferably steps-down a power source signal voltage such as a +120 volt AC signal originating from main electrical power lines. The supply may also step-down or directly rectify a power source signal originating from other suitable sources such as a local electric generator. For example, the converter may step-down a +120 volt AC signal to a +12 volt pulsating DC input signal present between lines 14 and 16 for sampling and switching. The converter may also supply regulated DC to power electronic components. The converter may also supply −12 volts DC (not shown) for powering components. However, the use of different electronic components may eliminate the need for a negative supply voltage. The DC converter is grounded at the line 16 which is preferably connected to a chassis that supports the controller. A voltage source sampler circuit 18 provides a pulsating DC sampled input signal having a voltage proportional to the step-down source signal, and is preferably filtered to average the voltage of the sampled signal over several cycles of the step-down source signal. A cut-in set point circuit 20 provides a reference voltage, preferably user adjustable, that is reduced in magnitude from and represents a predetermined voltage. The predetermined voltage is defined as the voltage level that the power source must decrease to from its unsagged state in order for controller regulation to begin. For example, it may be desirable to set regulation to begin when +120 VAC coming from the main power lines drops to a predetermined voltage of +95 VAC.

The sampled voltage and cut-in set point reference voltage are received by a differential amplifier circuit 24 which subtracts the sampled voltage from the reference voltage. When the sampled voltage is greater than or equal to the reference voltage, the result of the subtraction is respectively a negative voltage and zero which the controller 10 ignores. However, when the sampled voltage falls below the reference voltage (due to sagging of the power source signal voltage), the result of the subtraction is a differential signal having a voltage proportional to the difference. As the difference grows or shrinks the positive differential signal voltage from the differential amplifier circuit 24 correspondingly grows or shrinks.

A sawtooth generator circuit 26 generates a sawtooth signal having a voltage which repeatedly rises from zero volts to a predetermined maximum, of say six volts, at 120 cycles per second (Hertz or Hz.). The sawtooth generator circuit 26 is triggered by the pulsating DC signal from the DC converter 12. The sawtooth signal begins to rise substantially synchronously with the power source signal just after the pulsating DC input signal rises above zero volts which is nearly the same time when the power source signal voltage is just passing a zero crossing and is rising. The sawtooth signal is reset to zero volts just before the next zero crossing. Thus, a sawtooth cycle is generated for each half cycle of the power source signal.

A sawtooth adjust circuit 28 is a voltage divider means for adjusting the maximum output voltage of the sawtooth signal. The sawtooth adjust circuit is preferably user adjustable to control the rate of rise (slope) of the sawtooth signal. The period of the sawtooth signal is fixed at 1/120th second such that increasing the voltage adjustment increases the slope and corresponding maximum voltage of the adjusted sawtooth signal, and lowering the voltage adjustment decreases the slope and corresponding maximum voltage of the sawtooth signal.

Preferably, a ramp generator circuit 30 is included and is triggered as a one-shot action each time the output signal voltage from the differential amplifier circuit 24 goes positive. The ramp generator generates an output voltage above the maximum voltage of the adjusted sawtooth signal, and then the output voltage of the ramp generator rapidly decays.

The ramp and differential signals are received by a comparator circuit 32 such that the higher voltage level of the ramp or differential signal is compared with the adjusted sawtooth signal voltage. When the sawtooth signal voltage is less than the differential or ramp signal voltage the output voltage of the comparator circuit 32 is zero or negative. Obviously, if the ramp generator is not included the comparator will only compare the voltage level of the differential and sawtooth signals. Depending on the voltage level of the higher of the differential and ramp signals, and the slope of the sawtooth signal, the voltage level of the sawtooth signal will cross the voltage level of the differential signal or the ramp signal (whichever is higher) at some point in the ½ cycle period of the sawtooth signal. When the sawtooth voltage level rises to the voltage level of the differential signal or ramp signal, the comparator goes high to couple the power source signal to one or more electrical loads. In this embodiment, the comparator signals an optical coupler circuit 34 to activate a thyristor circuit 36 for coupling load(s) to the power source. The thyristor circuit is line voltage commutated so that after the thyristor circuit is activated, power source voltage passes to the load 22 until the power source voltage crosses zero volts. Power does not return to the load until the thyristor circuit is activated in the next half cycle of the power source signal.

When the voltage level of the ramp capacitor falls below the voltage level of the differential signal, the voltage level of the differential signal alone is compared by comparator 32 to the voltage level of the adjusted sawtooth signal to determine timing of activation of the thyristor circuit. Triggering the ramp generator is a one-shot action that occurs each time the voltage level of the differential signal becomes positive. The action of the ramp signal forces the first few activations of the thyristor circuit 36 after the differential signal becomes positive to occur very late in a ½ cycle of the power source signal, and the activation becomes progressively earlier as the voltage level of the ramp signal decays as the ramp capacitor discharges. Thus the voltage and associated power to connected loads, such as load 22, is ramped up in each succeeding ½ cycle after the differential signal becomes positive until the voltage level of the ramp signal falls below the differential signal voltage. Without this ramping action the possibility exists that the sawtooth and differential signal voltages may become equal at a time during a ½ cycle when the source voltage is at or near the peak which may cause an overload condition or a surge that might be detrimental to a connected load, such as the blowing of a lamp filament.

The on-delay timer circuit 38 is preferably included to ensure that the power converter to be coupled to the controller is in full operation before allowing any activation of the thyristor circuit for passing power to the load. A brownout detector circuit 39 is also preferably included so that if the power source voltage falls to a preset value for a preset number of seconds as determined by the brown out timer circuit 40, the optical coupler circuit 34 is disabled and the connected load 22 is decoupled from its power source such as electrical power lines or electric generators. An overcurrent device 41 is preferably included and serves to prevent circuit damage during a short circuit. The overcurrent device may be a rectifier grade fuse; however, other forms of electronic overcurrent protection are possible.

Figure 2A:
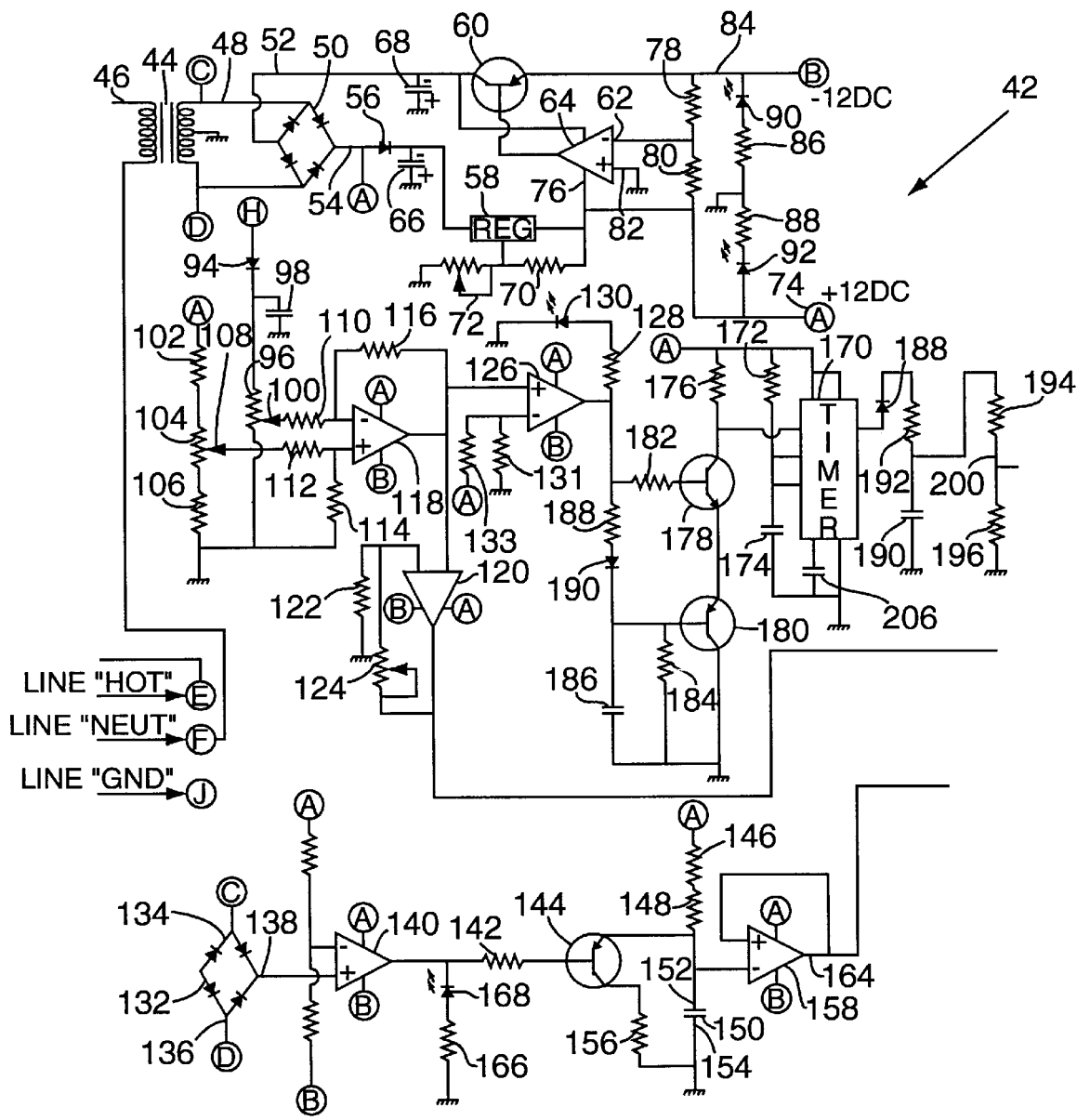
FIG. 2 is a circuit diagram showing the embodiment of FIG. 1 in greater detail.
Figure 2A:
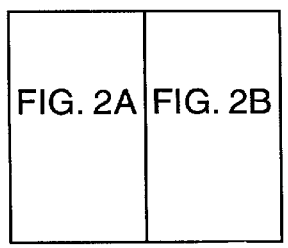
Figure 2B:
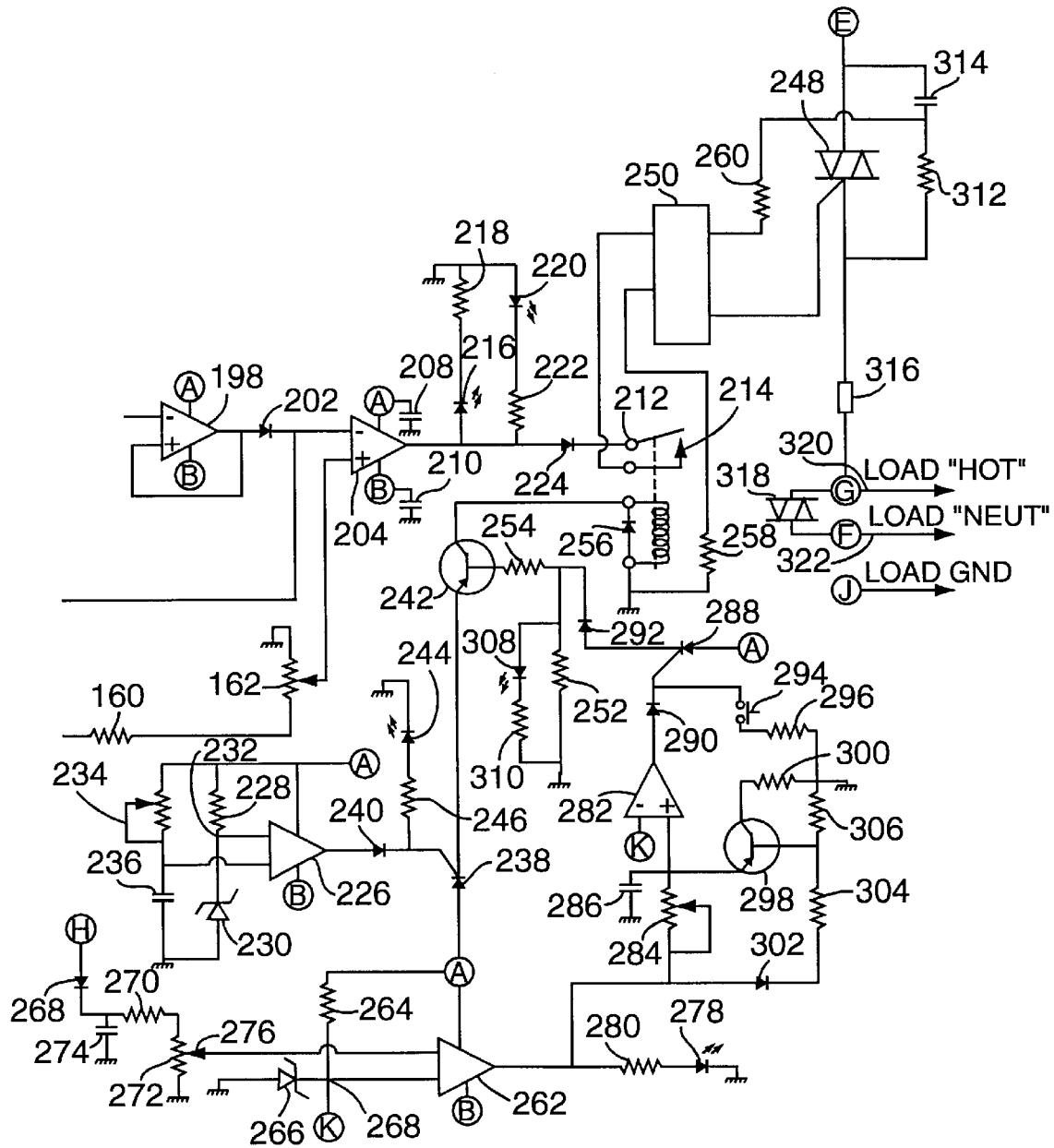

Turning now to FIG. 2, a controller 42 in a detailed embodiment of the present invention illustrates the block components of FIG. 1 in greater detail. The interaction of the circuit components comprising the block components of the controller in this embodiment will first be explained before later turning to examples of the controller's performance in regulating power to electrical loads as a function of the power source voltage.

With reference to FIGS. 1 and 2, the DC power converter 12 (which may be included with the controller or separately connected to the controller embodying the present invention) comprises a step-down means such as step-down transformer 44 which includes a 120 volt alternating current (AC) primary winding 46 and a 24 volt AC secondary winding 48 which is tapped at its center. The center tap is preferably connected to a chassis ground to permit the transformer to generate +12 volts and −12 volts with respect to ground. The 24 volt AC output is rectified such as by a full-wave bridge rectifier 50 to generate a pulsating +12 volt DC (VDC) signal at 52 and a pulsating −12 VDC signal at 54. The +12 VDC signal is transmitted through a blocking diode 56 and is received by a voltage regulator, such as an integrated circuit (IC) voltage regulator 58 which smoothes the +12 volt signal for powering other circuit components. The −12 VDC generated by the bridge rectifier 50 is received by the collector of a pnp power transistor 60 and the inverting terminal 62 of an operational amplifier 64. Filtering means such as capacitors 66 and 68 filter the pulsating +12 VDC and −12 VDC. Resistor 70 and variable resistor 72 cooperate to adjust the voltage level of the regulated signal generated by the voltage regulator 58. The +12 VDC regulated signal at the +12 VDC bus 74 is used to power the electronics comprising the controller 42 such as the +V terminal of the op amp 64 at 76. Op amp 64 is configured as a comparator (generates either a low voltage digital signal or a high voltage digital signal) with the inverting input 62 coupled to the center of a chain of two equal-value resistors 78 and 80 which resistors are coupled between the emitter of transistor 60 and the +12 VDC bus at 74. The non-inverting input 82 of the op amp 64 is grounded. The output signal generated by the op amp 64 is coupled to the base of the transistor 60. Thus whenever the voltage at the inverting input 62 of the op amp 64 is higher than ground (as when the load on the −12 VDC bus at 84 decreases) the output signal from the op amp 64 goes high and the transistor 60 is turned off until balance is achieved. The emitter of the transistor 60 is coupled to the −12 VDC bus 84 to supply power to the electronic components of the controller. Resistors 86 and 88 are current limiting resistors for light emitting diode 90 (LED) and LED 92 which are preferably included to respectively indicate the presence of negative and positive voltage for the electronics.

The voltage sampler circuit 18 of FIG. 1 obtains a sample of the pulsating DC input voltage which is a stepped-down power source voltage appearing at the positive terminal 52 of the bridge rectifier 50. The sampled DC voltage appears as a series of half sine waves at a frequency of 120 half cycles per second. The sample voltage is transmitted through blocking diode 94 and potentiometer 96 to ground. Capacitor 98 averages the pulsating DC over several cycles of the source voltage to allow short-term variations in the source voltage to pass without bringing the controller into operation. The voltage at the wiper 100 of potentiometer 96 is proportional to the source voltage averaged over several cycles and is used as the source voltage sample. This sample voltage is set to some convenient value, perhaps ¹⁄₂₀ of the root-mean-square (rms) power source voltage so that when the power source is at 120 VAC the sample voltage is 6 volts.

The cut-in set point circuit 20 of FIG. 1 comprises a resistor 102, a potentiometer 104 and a resistor 106 that are connected in series between the +12 VDC bus at 74 and ground. The wiper 108 of the potentiometer 104 is adjusted to provide a reference voltage corresponding to the power source voltage for which it is desired for the controller to begin regulation. This reference voltage would be set at, for example, 6 VDC if it is desired for the controller to begin regulation if the source voltage falls below a predetermined voltage of 120 VAC or at 5.5 VDC if regulation is desired when the source voltage falls below a predetermined voltage of 110 VAC. In the first example the set point is in the same proportion as the sample source proportion—in this case, ¹⁄₂₀th of the source voltage where it is desired for regulation to begin.

With reference to FIG. 2, resistors 110,112,114,116 and op amp 118 comprise the differential amplifier circuit 24 of FIG. 1. The output of the op amp 118 is a negative voltage or nearly zero which is disregarded as indicative of acceptable power source voltage by the controller when the source sample voltage is respectively greater than or equal to the cut-in set point voltage. The output of the op amp 118 becomes a positive voltage when the source voltage sample falls below the cut-in set point voltage as indicative of unacceptably low power source voltage. The positive output voltage of the op amp 118 increases or decreases as the difference between the sampled source signal voltage and the cut-in set point signal voltage increases (during a decrease in the power source signal voltage), or decreases (during an increase in the power source signal voltage).

Op amp 120, resistor 122 and variable resistor 124 comprise an adjustable non-inverting amplifier to raise the output of the op amp 118 to a convenient level for interaction with the sawtooth and ramp generator signals. In this embodiment, the output voltage of the op amp 120 is about six times the input voltage received from the op amp 118.

Op amp 126 is a comparator to provide current through resistor 128 to LED 130 when the output voltage of the op amp 126 is high to indicate that the source voltage sample has fallen below the cut-in set point voltage over several cycles of the power source signal. A change in the output voltage of the op amp 126 from low to high serves to trigger the ramp generator 30 of FIG. 1. In this embodiment, a voltage divider circuit comprising resistors 131 and 133, connected in series between the +12 VDC bus and ground, bias the inverting input of the op amp 126 with a positive voltage for forcing the voltage of the op amp 126 to remain low until there is a solid indication that a sagged source condition has occurred.

The sawtooth generator circuit 26 of FIG. 1 includes a full wave bridge rectifier 132 having AC terminals 134 and 136 coupled to the secondary windings of the transformer 44. The +DC terminal 138 of the bridge rectifier 132 provides a pulsating DC signal that is a series of half sine waves—two half sine waves for each cycle of the power source signal. These half sine waves are at nearly zero volts when the power source signal voltage crosses zero volts and each half sine wave rises above zero volts as the power source signal voltage passes the 0 and 180 degree points in a signal cycle. Op amp 140 is configured as a comparator. A reference voltage of a few millivolts DC is transmitted to the inverting input of the op amp 140, and the output of the positive terminal of the rectifier 132 is transmitted to the non-inverting input of the op amp 140. Thus, the output voltage of the op amp 140 is low when the +DC output of the rectifier 132 is below the reference of a few millivolts which occurs when the power source sine wave is near a zero crossing, and the output voltage of the op amp 140 is high when the half sine wave from the rectifier 132 rises above the reference voltage which occurs twice in each cycle of the power source signal. The output voltage of the op amp 140 is coupled through base resistor 142 to the base of pnp transistor 144. Resistors 146, 148 and capacitor 150 are arranged in series and connected from the +12 VDC bus to ground such that the resistors 146 and 148 control the charge rate of the capacitor 150. The positive end 152 of the capacitor 150 is coupled to the emitter of the transistor 144, and the negative end 154 is coupled to ground. The collector of the transistor 144 is coupled to ground through current limiting resistor 156. Thus at the start of each half sine wave or once for each half of the power source sine wave, the output voltage of the op amp 140 goes low which turns on the transistor 144 which drains any charge off of the capacitor 150 to ground. As the half sine waves rise above the reference voltage of a few millivolts, the output voltage of the op amp 140 goes high which turns off the transistor 144 and the voltage rises across the capacitor 150. The values of resistors 146, 148 and the capacitor 150 are chosen so that the most linear portion of the charge rate curve has a duration of more than one half wine wave (1/120th second). Thus, the voltage at the positive end 152 of the capacitor 150 goes from zero at each zero crossing of the power source and rises throughout the duration of each half of the power source sine wave until the power source sine wave nears a zero crossing whereupon the charge on the capacitor 154 is drained off and the charging of the capacitor 150 begins again. The result is a sawtooth wave going from zero to some predetermined voltage at a frequency of 120 Hz. Op amp 158 is configured as a voltage follower to provide a stronger signal that follows the voltage across the capacitor 150. For this embodiment the maximum voltage across the capacitor 150 reaches about 9 volts DC.

The sawtooth adjust circuit 28 of FIG. 1 comprises resistor 162 and potentiometer 162 coupled to the output 164 of the op amp 158 to form a voltage divider to provide for adjustment of the sawtooth signal voltage. The frequency of the sawtooth signal remains at 120 Hz. so that changing the maximum value of the sawtooth signal serves to change the signal's slope. To indicate zero crossings of a sawtooth signal, current limiting resistor 166 cooperates with LED 168 which lights each time the op amp 140 goes low.

The optional ramp generator comprises an integrated circuit (IC) timer, such as a 555 timer 170, configured in a one-shot mode. The length of the one-shot pulse is controlled by the resistor-capacitor (RC) circuit comprising resistor 172 and capacitor 174. The trigger terminal of the timer 170 is maintained at a positive voltage by connection to the +12 VDC bus through resistor 176. NPN transistor 178 and PNP transistor 180 are arranged with the collector of the transistor 178 coupled to the trigger terminal of the timer 170 and the emitter of the transistor 178 coupled to the emitter of the transistor 180 with the collector of the transistor 180 coupled to ground. The base of the transistor 178 is coupled to the output of the op amp 126 through 182. The base of the transistor 180 is coupled to ground through resistor 184 to keep the transistor 180 normally on, and is also coupled to the positive end of the capacitor 186 which is charged each time the output voltage of the op amp 126 goes high. This charging rate is controlled by resistor 188 and the capacitor 186. Blocking diode 190 prevents the charge on the capacitor 186 from reaching the base of the transistor 178.

When the sample source signal voltage falls sufficiently below the cutin set point signal voltage, as determined by the voltage divider comprising the resistors 131 and 133, the output voltage of the op amp 126 goes high. This turns on the transistor 178 which pulls the trigger voltage low for the timer 170 causing a one-shot pulse to be generated from the timer. If the output voltage from the op amp 126 remains high, the capacitor 186 charges to a voltage that will cause the transistor 180 to turn off thus breaking the circuit from the trigger input of the timer 170 to ground and allowing the trigger input to rise. When the op amp 126 voltage output returns to a low state the charge on the capacitor 186 is discharged through the resistor 184 thus positioning the ramp generator for action at the next time the op amp 126 goes high. The output voltage from the timer 170 is transmitted through blocking diode 188 to charge capacitor 190 through resistor 192. Values for the resistor 192 and the capacitor 190 are chosen so that the capacitor 190 charges to about +10 VDC rapidly. The positive end of the capacitor 190 is coupled to ground through resistors 194 and 196 in series which act as a voltage divider and a path for the discharge of the voltage on the capacitor 190 at a controlled rate. Op amp 198 is configured as a voltage follower to follow the voltage present at the junction 200 of the resistors 194 and 196. The output voltage of the op amp 198 is transmitted through blocking diode 202 to the inverting input of an op amp 204 forming part of the comparator circuit 32 of FIG. 1.

The comparator circuit 32 of FIG. 1 is comprised in part by the op amp 204. The signal having the higher voltage from the differential amplifier circuit 24 and the ramp generator circuit 30 is transmitted to the inverting input of the op amp 204 and the adjusted signal from the sawtooth generator 26 is transmitted to the non-inverting input of the op amp 204. Bypass capacitors 208 and 210 provide dependable operation of the op amp 204. The output voltage of the op amp 204 is low until the sawtooth signal voltage rises above the higher voltage of the ramp generator signal or the differential amplifier signal. The output voltage from the op amp 204 is transmitted to a normally-open contact 212 of relay 214, to LED 216 and through limiting resistor 218 to ground, and to LED 220 through limiting resistor 222. LED 216 lights to indicate that the thyristor circuit 36 of FIG. 1 is not being activated, and LED 220 lights to indicate that a signal to activate the thyristor circuit is present. Blocking diode 224 is provided for dependable operation.

The on-delay timer circuit 38 of FIG. 1 includes op amp 226 which is configured as a comparator. Preferably, resistor 228 and zener diode 230 are connected in series between the +12 VDC bus and ground for maintaining a predetermined reference voltage at the junction 232. The voltage at the junction 232 of the resistor 228 and the zener diode 230 is predetermined to be around 6 VDC and is coupled to the non-inverting input of the op amp 226. Alternatively, the resistor/zener diode combination may be substituted by other like means for maintaining a predetermined reference voltage at the junction 232, such as using a voltage divider circuit. One end of variable resistor 234 is coupled to the +12 VDC bus and the other end is coupled to the positive end of capacitor 236. The negative end of the capacitor 236 is coupled to ground. The voltage at the positive end of the capacitor 236 is transmitted to the non-inverting input of the op amp 226. Upon initial application of power to the controller the voltage across the capacitor 236 is zero whereas the voltage at the inverting input of the op amp 226 rises to +12 VDC rapidly. The capacitor 236 begins to charge through the variable resistor 234 upon application of power such that when the voltage across the capacitor 236 reaches the reference voltage at the inverting input to the op amp 226, the output voltage of the op amp 226 changes from low to high. The output voltage of the op amp 226 is coupled to the gate of silicon-controlled rectifier (SCR) 238 through blocking diode 240. The anode of the SCR 238 is coupled to the +12 VDC bus, and the cathode is coupled to the emitter of PNP transistor 242. The time for the capacitor 236 to charge high enough for the op amp 226 to change to a high output voltage is adjustable by the variable resistor 234. As such, the op amp 226 is prevented from going to high output voltage and triggering or firing the SCR 238 immediately upon application of power. Furthermore, the firing of the SCR 238 is delayed long enough to be sure that the DC power supply is in full operation. LED 244 whose current is limited by resistor 246 is coupled to the output of the op amp 226 and lights when the op amp 226 goes to a high output voltage indicating that the on-delay time has passed and that a signal is present to trigger the SCR 238 to conduct power to the emitter of the transistor 242.

The optical coupler circuit 34 will now be explained in detail in the embodiment of FIG. 2. The signal from the op amp 204 to trigger a thyristor 248 of the thyristor circuit 36 is transmitted to the normally open contact 212 of the single-pole-single-throw (SPST) relay 214. The coil-operating voltage for the relay is supplied by the +12 VDC bus through the SCR 238 and the PNP transistor 242. When both the SCR 238 and the transistor 242 are in the on state the coil of the relay closes the circuit between the output of the op amp 204 and an optical coupler 250. In this condition a high signal from the op amp 204 will cause firing of the thyristor 248. Resistor 252 couples the base of the transistor 242 to ground to keep the transistor 242 in the on state in the absence of a signal from the brown out detector which will be explained shortly. Resistor 254 is a base resistor limiting the current to the transistor 242. Diode 256 serves as a clamping diode for the relay coil. Resistor 258 is a current limiting resistor for the optical coupler low voltage side. Resistor 260 is a current limiting resistor of the optical coupler thyristor side.

The brown-out detector circuit 39 of FIG. 1 will now be explained with reference to FIG. 2. Op amp 262 of the brown-out circuit is configured as a comparator. Preferably, resistor 264 and zener diode 266 are connected in series from the +12 VDC bus to ground for maintaining a predetermined reference voltage of about 6 VDC at the junction 268 of the resistor 264 and the zener diode 266 which is supplied to the non-inverting input of the op amp 262. Alternatively, other equivalent means may be substituted for maintaining the predetermined reference voltage, such as a voltage divider network. The inverting input of the op amp 262 is supplied by a connection to the anode of the diode 56 through blocking diode 268 and a voltage divider comprising resistor 270 and potentiometer 272. The capacitor 274 averages the pulsating DC at the cathode of the diode 268 over several cycles and causes short term sags in the source voltage to be disregarded. The wiper 276 of the potentiometer 272 is coupled to the inverting input of the op amp 262. The potentiometer 272 is adjustable to provide a voltage equal to the reference voltage for the op amp 262 when the power source voltage has sagged enough to be considered brown-out—about 90 volts in this embodiment. At any source voltage above the brown-out set point the voltage at the wiper of the potentiometer 272 will be higher than the reference voltage and the output voltage of the op amp 262 will be low. If the source voltage falls below the brown-out set point, the voltage at the wiper of the potentiometer 272 will be less than the reference voltage at the non-inverting input of the op amp 262 and the output voltage thereof will go high. LED 278 is coupled to the output of the op amp 262 through current limiting resistor 280 and lights when the output voltage of the op amp 262 is high to indicate that the source voltage is below the predetermined brown-out set point.

The brown-out timer circuit 40 of FIG. 1 will now be explained with respect to the embodiment of FIG. 2. Op amp 282 is configured as a comparator. A reference voltage of about 6 VDC to the inverting input is received from the junction 268 of the resistors 264 and 266. The non-inverting input of the op amp 282 is supplied from the output of the op amp 262 through variable resistor 284. The non-inverting input is also coupled to the positive end of capacitor 286 whose negative end is grounded. The output voltage state of the op amp 282 is normally low. In the event that the source voltage sags below the predetermined brown-out level, the output voltage of the op amp 262 goes high and the capacitor 286 begins to charge. The charging rate of the capacitor 286 is controlled by the variable resistor 284. If the brown-out condition persists long enough for the charge on the capacitor 286 to exceed the reference voltage to the op amp 282 the output voltage of the op amp 282 goes high. The output of the op amp 282 is coupled to the gate of SCR 288 through blocking diode 290. The anode of the SCR 288 is coupled to the +12 VDC bus, and the cathode is coupled through blocking diode 292 to the base of the transistor 242 through the base resistor 254. When the op amp 282 goes high, the SCR 288 is triggered into conduction which turns off the transistor 242. When the transistor 242 goes off the circuit to the relay coil is broken and the thyristor firing ceases which in turn decouples the load from the power source.

Switch 294 is a normally open SPST momentary switch when closed clears the turning-off of the transistor 242 by pulling the gate of the SCR 288 to ground potential through resistor 296. The emitter of PNP transistor 298 is coupled to the positive end of the capacitor 286, and its collector is coupled to ground through current limiting resistor 300. The base of the transistor 298 is supplied from the output of the op amp 262 through blocking diode 302 and base resistor 304. The base of the transistor 298 is also coupled to ground through resistor 306. Whenever the output voltage of the op amp 262 is low, the transistor 298 is turned on thus keeping the non-inverting input of the op amp 262 at a voltage well below its reference voltage, and thus the output voltage of the op amp 262 is held low. When a brown-out situation is detected and the output voltage of the op amp 262 goes high, the transistor 298 is turned off and the capacitor 286 begins to charge. If the brown-out condition is corrected before the voltage across capacitor 286 reaches a level that would put the output voltage of the op amp 262 high, the transistor 298 turns on thus returning the non-inverting input of the op amp 262 to a low voltage state by draining the charge on the capacitor 286 to ground. This action prevents the capacitor 286 from reaching a charge that would cause the thyristor firing to be latched off as a result of the accumulation of charge from several separate events of source voltage sagging to less than the predetermined brown-out voltage. LED 308 coupled to current limiting resistor 310 lights when the SCR 288 has been triggered into conduction.

The thyristor circuit 36 of FIG. 1 comprises the thyristor 248 in conjunction with resistor 312 and capacitor 314 forming a phase shift network to provide power for the firing of the gate of the thyristor 248 (a triac in this embodiment) through the optical coupler 250. The over current circuit 41 of FIG. 1 comprises in this embodiment a rectifier grade fuse 316. However, other forms of electronic overcurrent protection are possible. A metal oxide varistor 318 is included across the hot and neutral load terminals 320 and 322 respectively to absorb surges on the load side of the controller.

FIGS. 3 through 10 illustrate an example of various signal waveforms, defined in the lower legends, acted upon or generated by the controller of the present invention during a typical start-up of an induction motor coupled thereto. FIGS. 3, 5, 7 and 9 show the sawtooth, ramp and differential signal in DC volts (vertical axis) versus phase angle in degrees (horizontal axis). FIGS. 4, 6, 8 and 10 show the source signal, the signal coupled to the load, and the unsagged source signal in AC volts (vertical axis) versus phase angle in degrees (horizontal axis). In the example set forth in FIGS. 3–10, the sawtooth signal frequency is 120 Hz, the power source signal frequency is 60 Hz, the predetermined voltage to start controller operation is set at 110 volts, the maximum sawtooth voltage at 9 volts and application of the load decreases the power source to 95 volts.

Figure 3:
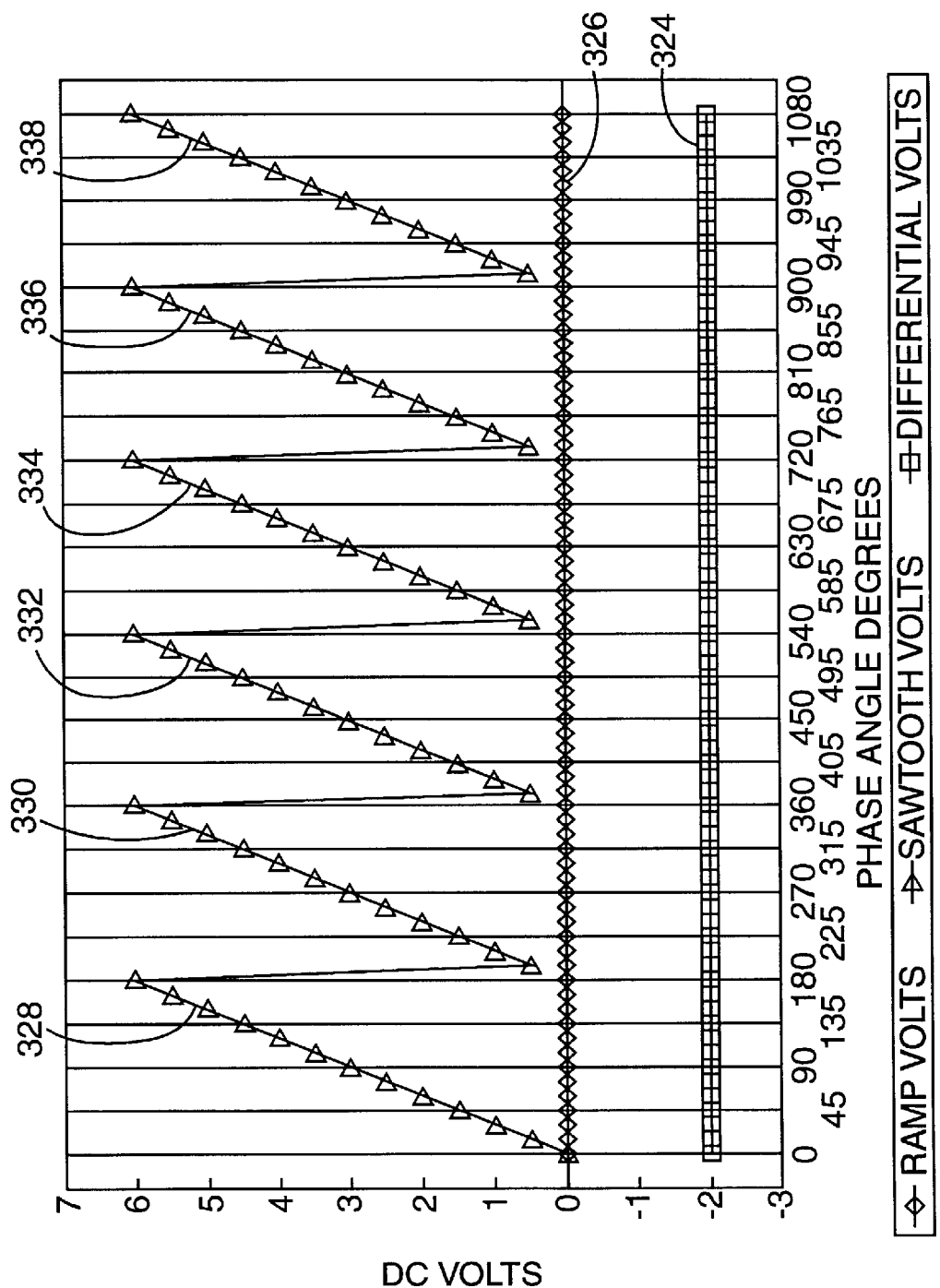
FIG. 3 is a graph illustrating an example of control waveforms generated by the circuit of FIG. 2 during a first period of circuit operation.
Figure 4:
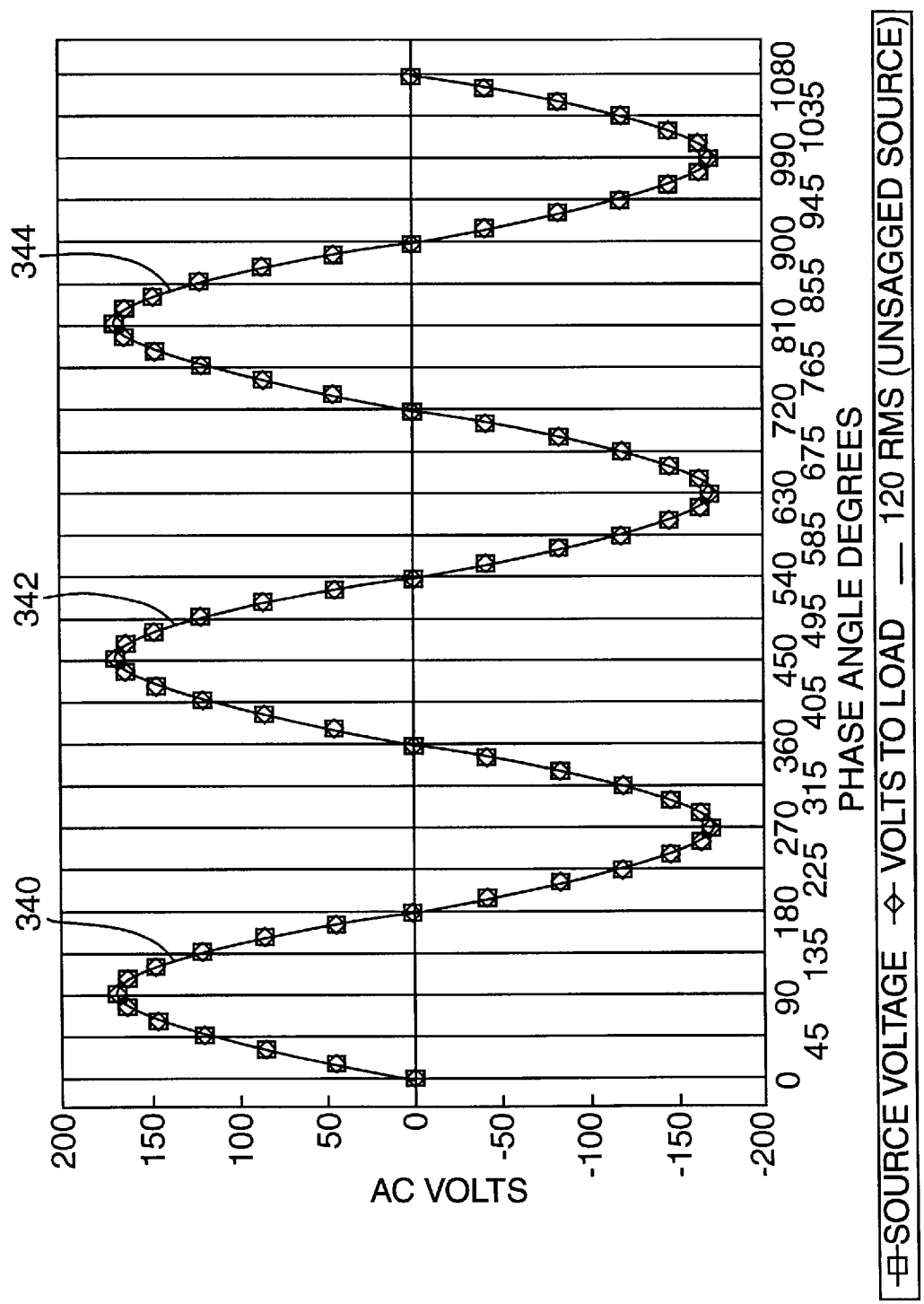
FIG. 4 is a graph illustrating an example of waveforms representing the source voltage and the voltage to the load of the circuit of FIG. 2 during the first period of circuit operation.

Turning now to FIGS. 3 and 4, an example of the operation of the controller before a load change will be explained during a first three cycles of the power source signal when the power source is not sagged. As can be seen in FIG. 3, the voltage of a differential circuit signal 324 is negative and the voltage of a ramp generator signal 326 is zero, indicating that the controller passes full power to the load. Each sawtooth cycle 328, 330, 332, 334, 336 and 338 corresponds to one half cycle of the power source signal. For example, sawtooth cycles 328 and 330 correspond to the first power source cycle, sawtooth cycles 332 and 334 correspond to the second power source cycle, and sawtooth cycles 336 and 338 correspond to the third power source cycle.

The first three cycles of the power source signal as defined in FIG. 3 is illustrated in FIG. 4 as cycles 340, 342 and 344. As can be seen in FIG. 4, the source voltage equals the normal source voltage during the first three cycles of the power source signal because the power source is not sagged. As such, the thyristor circuit of FIG. 1 is activated nearly at the beginning of each half cycle of the power source signal in order to transmit virtually all of the power from the power source to the load. The power passed to the load is represented by the shaded area under the "sagged" source signal.

Figure 5:
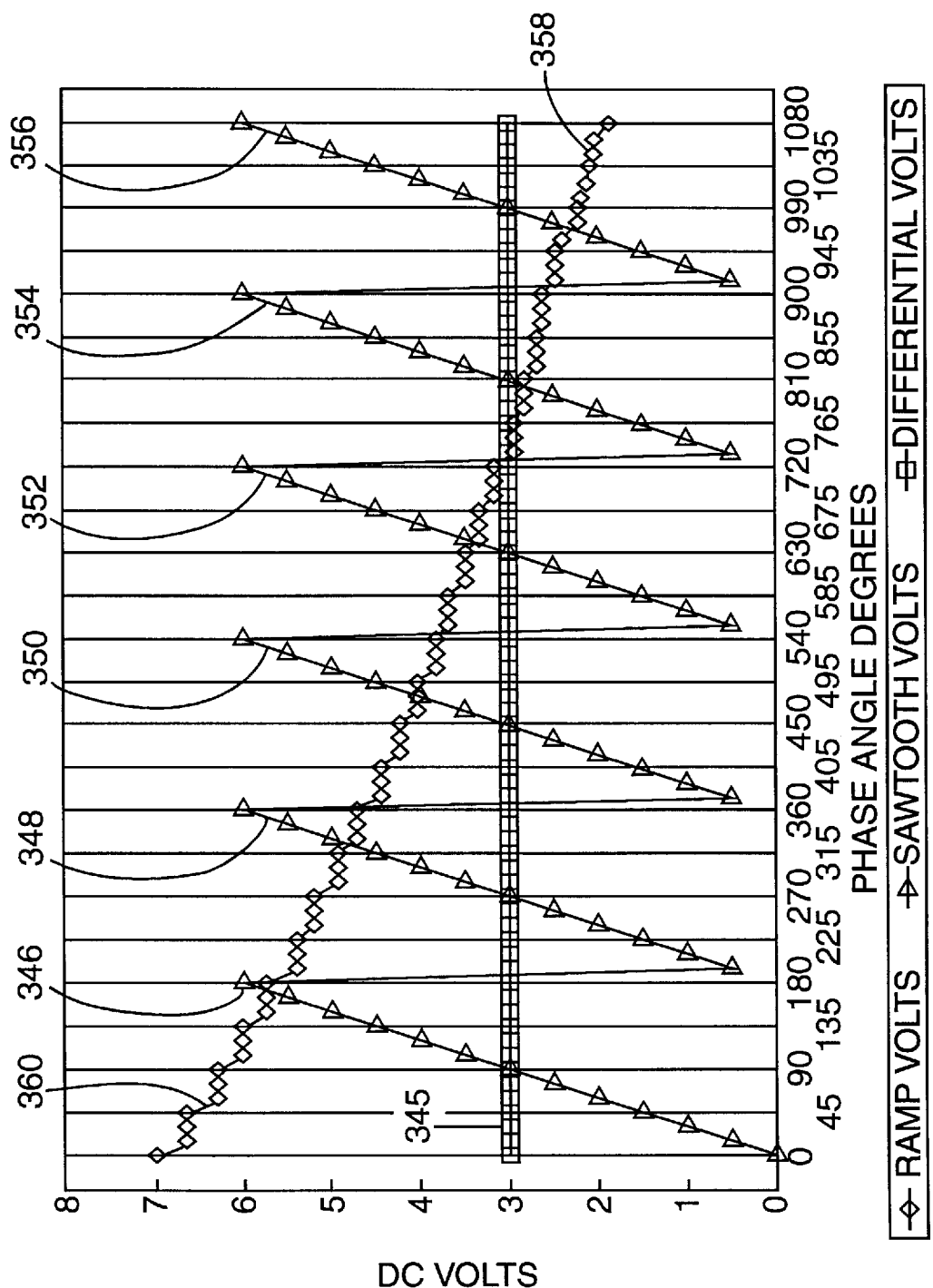
FIG. 5 is a graph illustrating an example of control waveforms generated by the circuit of FIG. 2 during a second period of circuit operation.
Figure 6:
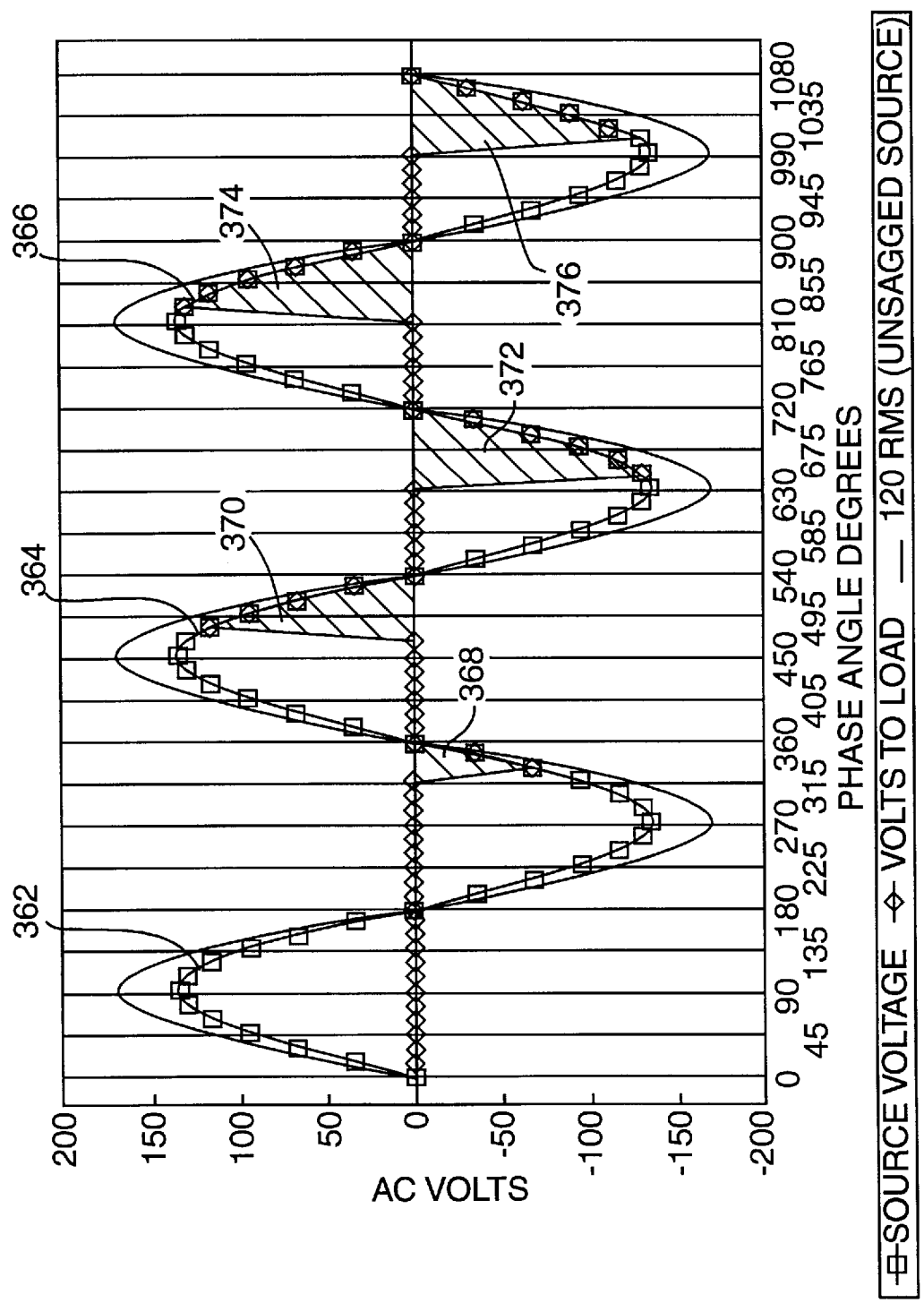
FIG. 6 is a graph illustrating an example of waveforms representing the source voltage and the voltage to the load of the circuit of FIG. 2 during the second period of circuit operation.

FIGS. 5 and 6 represent the operation of the controller during a second three cycles of the power source signal shortly after a load is coupled to the load side at the start of the fourth cycle. The voltage of the differential signal 345 has risen from zero volts (see FIG. 3) to three volts at to indicate a power sag below the predetermined voltage for triggering controller regulation. Sawtooth cycles 346 and 348 correspond to the fourth power source cycle, sawtooth cycles 350 and 352 correspond to the fifth power source cycle, and sawtooth cycles 354 and 356 correspond to the sixth power source cycle. FIG. 5 illustrates the triggering of the ramp generator circuit which injects a ramp generator signal 358 having a voltage at 360 above that of the cycle 346 of the sawtooth signal. As can be seen in FIG. 5, the ramp generator signal voltage upon reaching its maximum voltage level begins to rapidly decay during subsequent cycles 348 through 356 of the sawtooth signal. During cycles 346 through 352 of the sawtooth signal, the ramp signal voltage at first exceeds the differential signal voltage and so controls activating the thyristor circuit which in turn couples the power source to the load.

The second three cycles of the power source signal as defined in FIG. 5 is illustrated in FIG, 6 as cycles 362, 364 and 366. As can be seen in FIG. 6, the percentage of full power passed to the load (shaded area under the sagged source signal) starts at a small value (area 368) and rises (progressively larger areas 370, 372, 374 and 376) as the activation of the thyristor circuit progressively becomes earlier and earlier in each half cycle of the power source signal. With reference to FIG. 5, at cycle 354 of the sawtooth signal, the ramp signal voltage has fallen below the differential signal voltage so that the differential voltage now controls the activation of the thyristor circuit.

Figure 7:
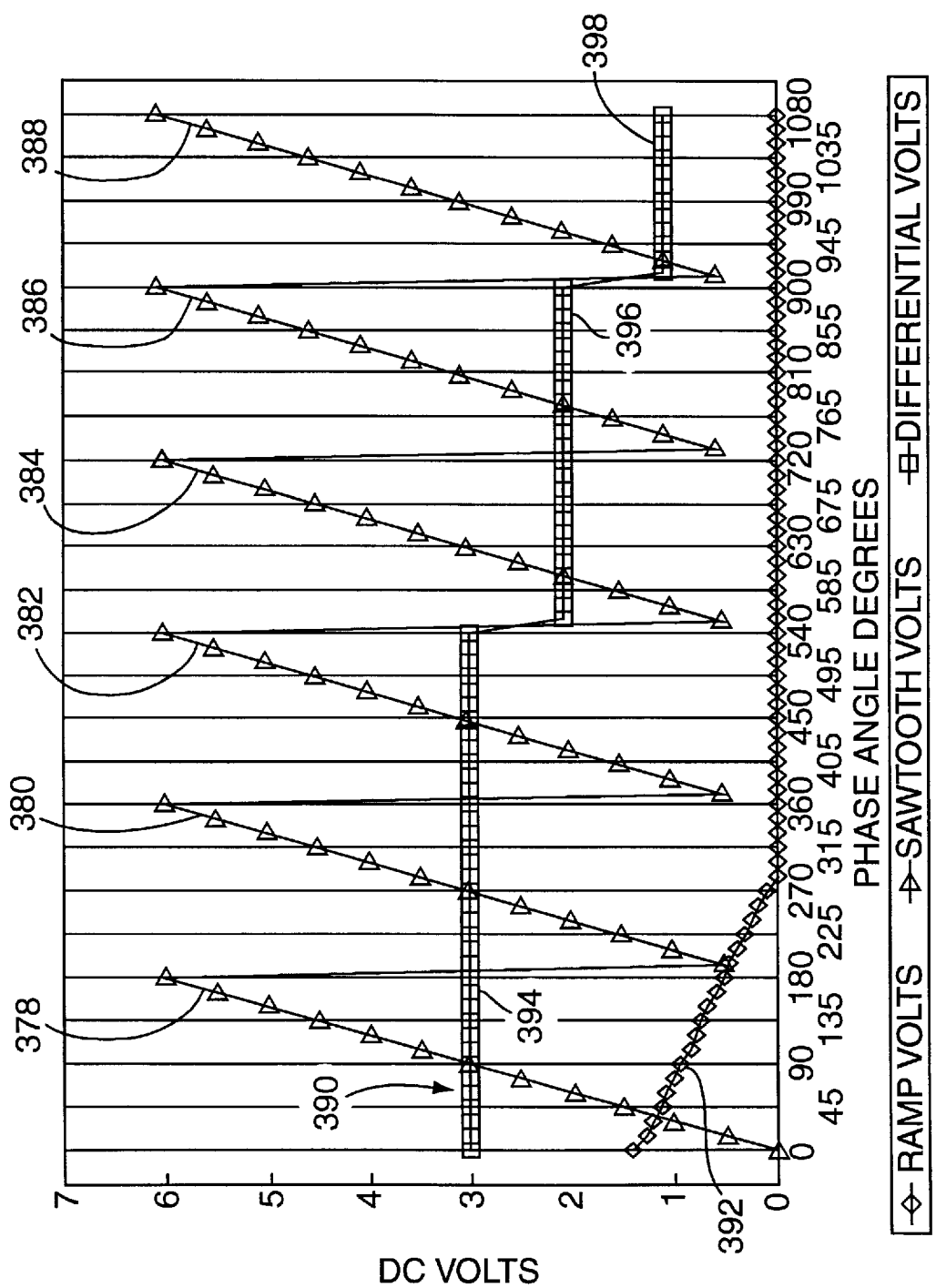
FIG. 7 is a graph illustrating an example of control waveforms generated by the circuit of FIG. 2 during a third period of circuit operation.
Figure 8:
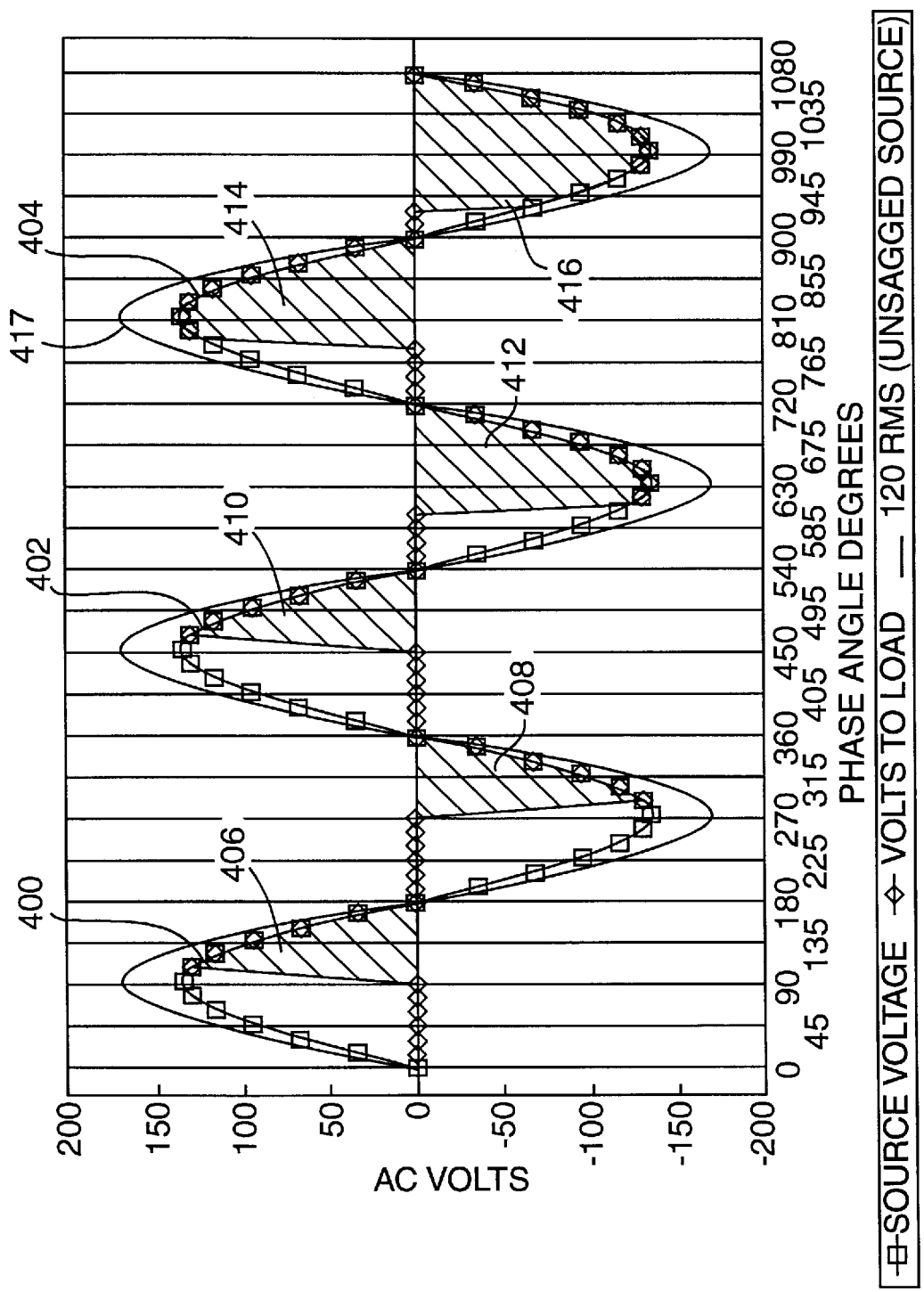
FIG. 8 is a graph illustrating an example of waveforms representing the source voltage and the voltage to the load of the circuit of FIG. 2 during the third period of circuit operation.

FIGS. 7 and 8 represent a third three cycles of the power source signal with the coupled load. Sawtooth cycles 378 and 380 correspond to the seventh power source cycle, sawtooth cycles 382 and 384 correspond to the eighth power source cycle, and sawtooth cycles 386 and 388 correspond to the ninth power source cycle. With reference to FIG. 7, the voltage of the differential signal 390 is above that of the ramp signal 392. Because the timing of the thyristor circuit activation initially occurs late in each half cycle of the power source signal, the reduced power to the load enables the voltage of the sagged power source signal to more quickly recover to the normal or unsagged source voltage than would otherwise occur if full power were passed to the load. Thus, the reduced power to the load causes the differential signal voltage (representing the difference between the predetermined regulation voltage and sagged source voltage) to quickly diminish from three volts to one volt. For example, during the sawtooth cycles 378 through 382, the differential signal voltage at 394 is three volts; during the sawtooth cycles 384 and 386, the differential signal voltage at 396 is two volts; and during the sawtooth cycles 378 through 382, the differential signal voltage at 398 is one volt. As the differential signal voltage progressively diminishes, the activation of the thyristor circuit becomes progressively earlier and earlier in each half cycle of the power source signal in order to pass a greater percentage of full power to the load.

The third three cycles of the power source signal as defined in FIG. 7 is illustrated in FIG. 8 as cycles 400, 402 and 404. As can be seen in FIG. 8, the percentage of full power passed to the load (shaded areas 406, 408, 410, 412, 414 and 416 under the sagged source signal) continues to progressively increase during each half-cycle of the power source signal as the activation of the thyristor circuit progressively becomes earlier and earlier in each half cycle of the power source signal. Furthermore, the maximum voltage level of the sagged power source signal is starting to progressively increase during successive cycles toward the voltage of the unsagged source reference signal 417. The rebounding voltage of the source signal accounts for the progressively diminishing differential signal voltage as previously explained in FIG. 7. At the end of the ninth cycle of the power source signal, the thyristor circuit is being activated very early in the half cycle and the load receives nearly all of the power from the power source as represented by the shaded area 416 under the sagged source signal.

Figure 9:
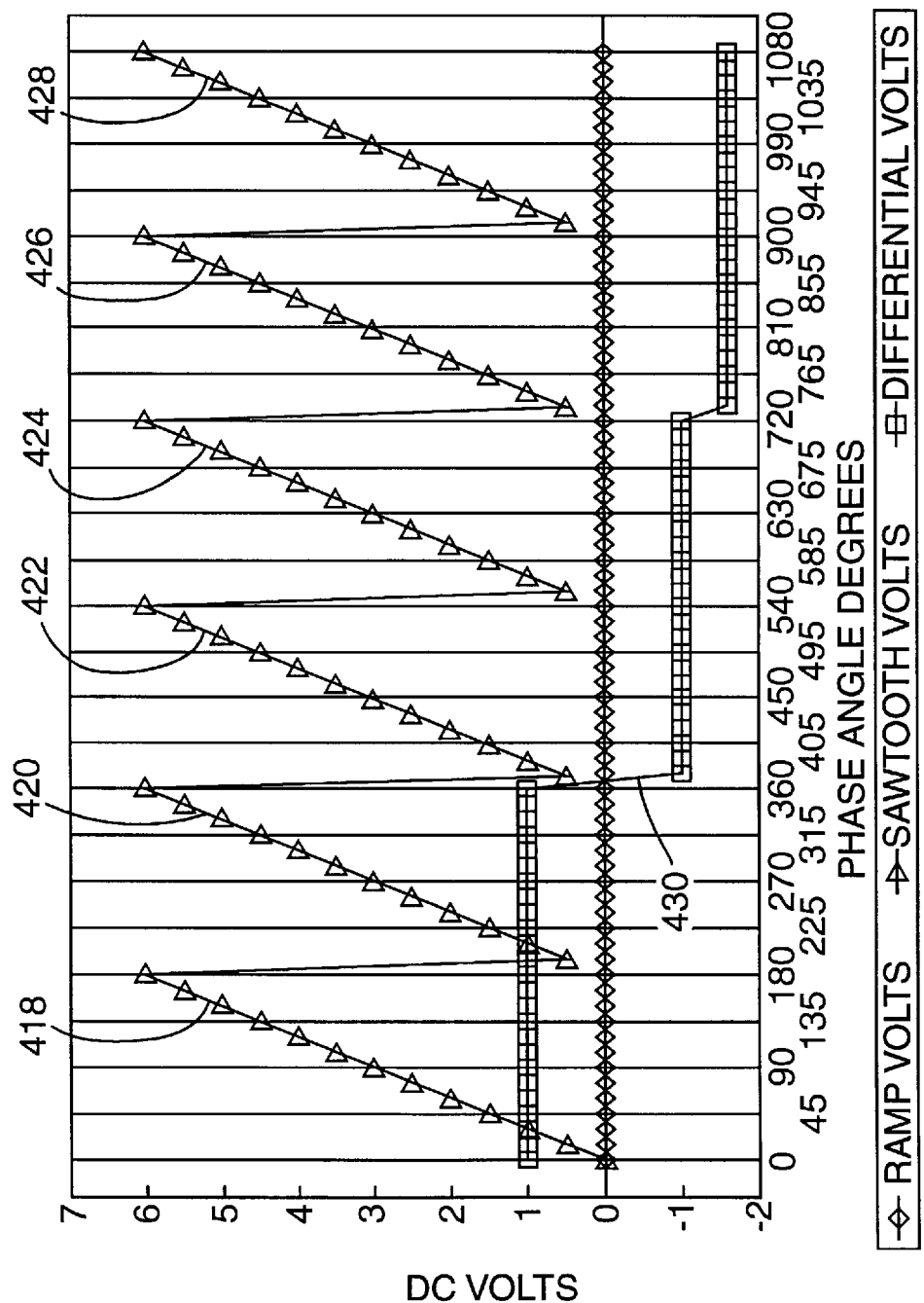
FIG. 9 is a graph illustrating an example of control waveforms generated by the circuit of FIG. 2 during a fourth period of circuit operation.
Figure 10:
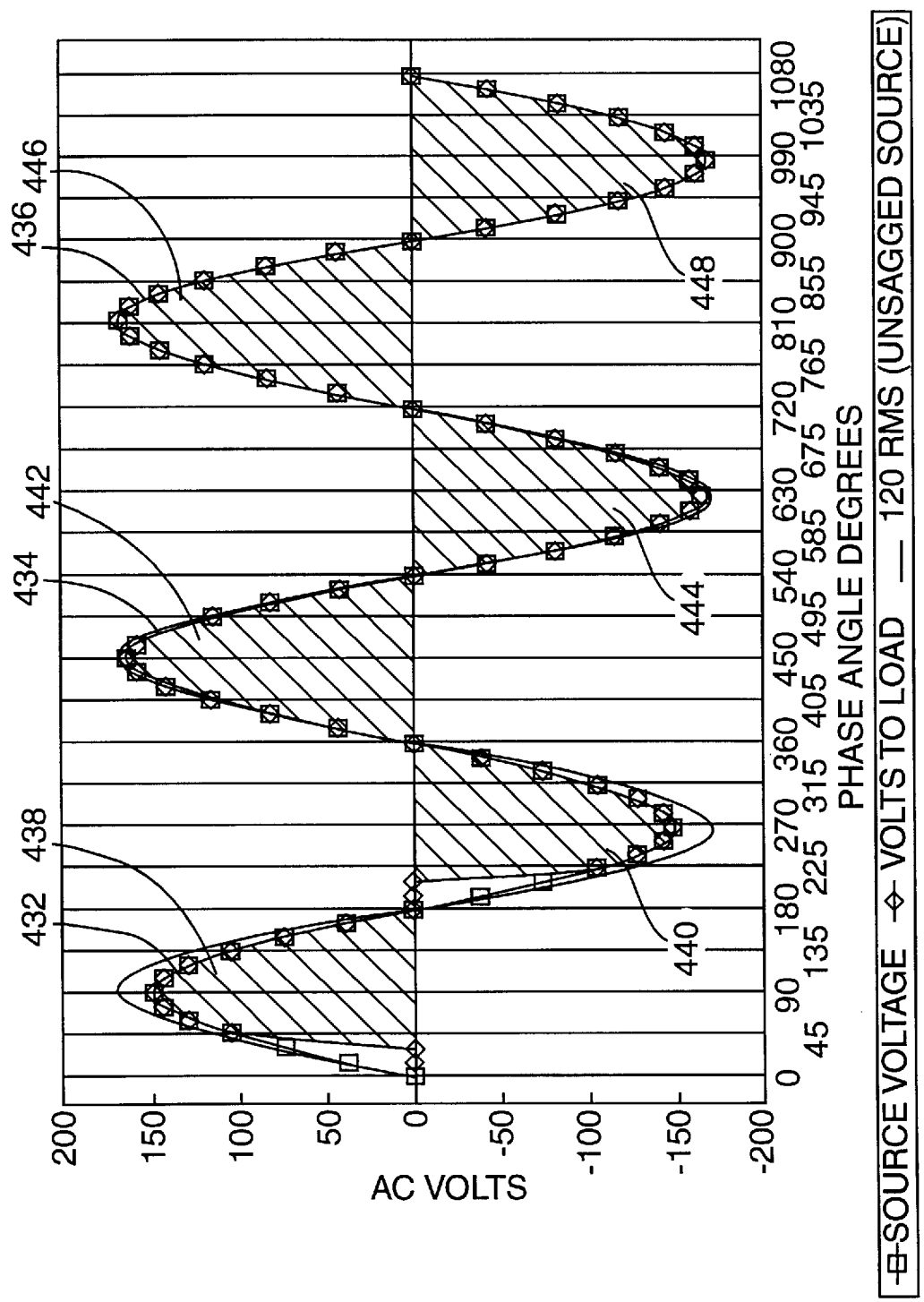
FIG. 10 is a graph illustrating an example of waveforms representing the source voltage and the voltage to the load of the circuit of FIG. 2 during the fourth period of circuit operation.

FIGS. 9 and 10 represent a fourth three cycles of the power source signal with the coupled load. Sawtooth cycles 418 and 420 correspond to the tenth power source cycle, sawtooth cycles 422 and 424 correspond to the eleventh power source cycle, and sawtooth cycles 426 and 428 correspond to the twelfth power source cycle. The fourth three cycles of the power source signal as defined in FIG. 9 is illustrated in FIG. 10 as cycles 432, 434 and 436. Referring to FIG. 9, at the end of the tenth cycle at 430, the power source has returned to being above the predetermined voltage (represented by the differential voltage becoming zero or negative as shown in FIG. 8). As such, the thyristor circuit is activated nearly at the beginning of each half cycle of the power source signal in order to transmit virtually all of the power from the power source to the load, as shown in FIG. 10 by the shaded areas 438, 440, 442, 444, 446 and 448.

Figure 11:
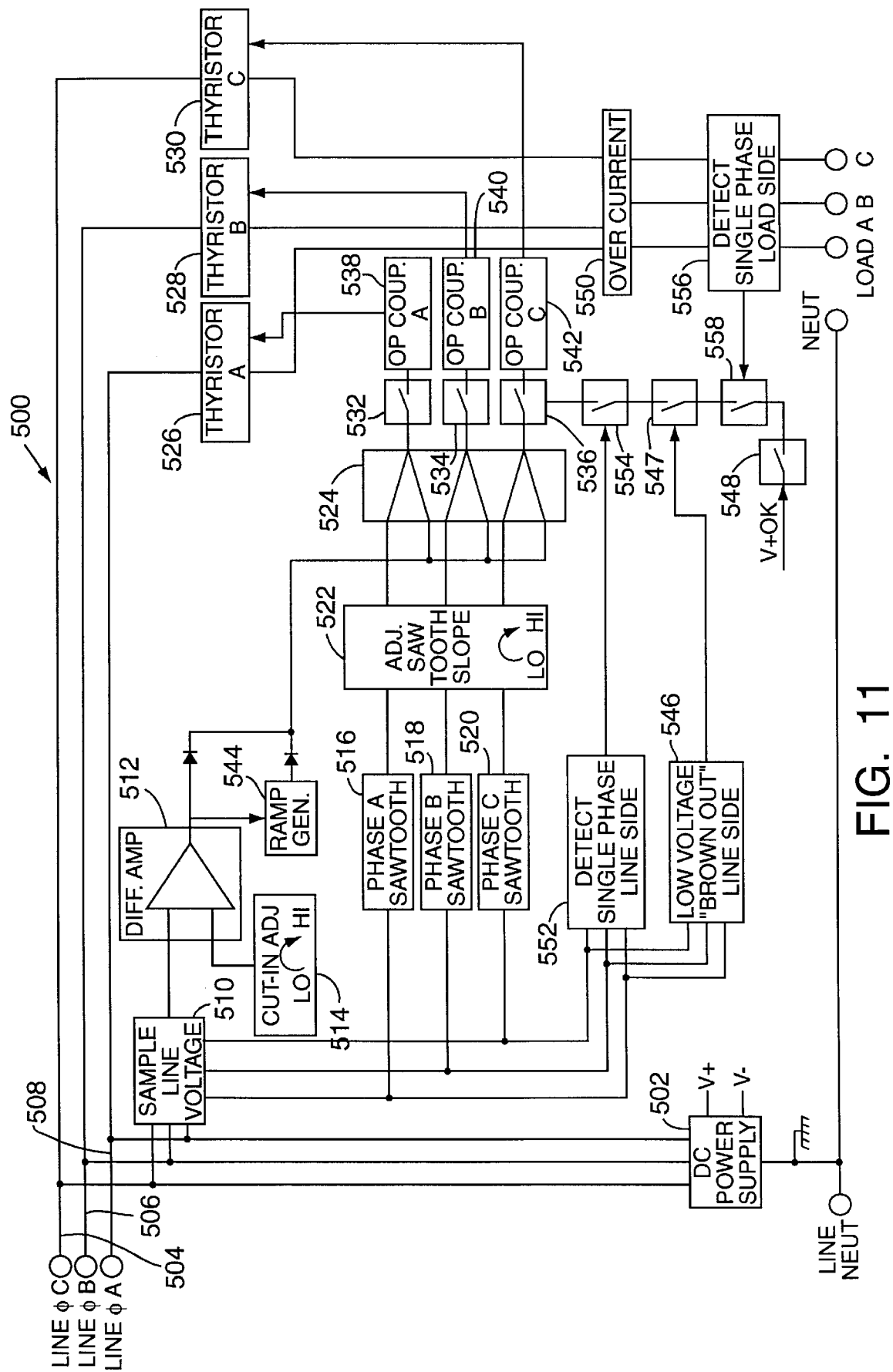
FIG. 11 is a block diagram illustrating a three-phase embodiment of the present invention.

FIG. 11 is a block diagram showing a three-phase embodiment of the present invention. Like components with the one-phase embodiments previously described have like reference numbers and will not be described in detail unless necessary to understand the three-phase embodiment.

Turning now to FIG. 11, a block diagram of a three-phase controller embodying the features of the present invention is generally designated by the reference number 500. A DC power supply 502 rectifies three-phase AC signals into pulsating DC signals wherein each phase of an AC signal is supplied from one of the power lines 504, 506 and 508. Each of the pulsating DC signals is input to a source voltage sampler 510 for averaging the pulsating DC signals over several cycles. Each of the averaged or sampled signals is input to a differential amplifier circuit 512 along with a predetermined cut-in signal voltage generated by the cut-in circuit 514 for generating a differential signal indicating if the voltage of one of the power lines has decreased enough to activate the controller. Each of pulsating DC signals is coupled to one sawtooth generator 516, 518 or 520 for generating sawtooth signals associated with each phase. Each of the sawtooth signals associated with a phase is compared with the differential signal via a sawtooth adjust circuit 522 at comparator 524 to determine when to activate each of thyristor circuits 526, 528 and 530 wherein each thyristor circuit is associated with one of the phases. The comparator upon determining that a thyristor circuit is to be activated transmits a signal through the relay switches 532, 534 and 536 each associated with a phase so as to energize an associated optical coupler circuit 538, 540 and 542 which in turn activate the respective thyristor circuits 526, 528 and 530.

Preferably, the controller includes, as in the one-phase embodiment, a ramp generator 544 for extra in-rush current protection of the controller. The controller may also include a low-voltage "brown-out" detector circuit 546 which opens an associated switch 547 upon a brown-out condition in order to open the relays 532, 534 and 536 which in turn deactivates the thyristor circuits 526, 528 and 530. The controller also preferably includes an on-delay timer which closes an associated switch 548 after a predetermined time period has elapsed after the controller is connected to a power source in order to ensure that all controller components are biased by the power source before the thyristor circuits are activated. An overcurrent circuit 550 may also be provided to protect the connected loads.

The three-phase controller may also include a single-phase detector 552 coupled to the source side of the controller for opening an associated switch 554 in order to open the relays 532, 534 and 536 which in turn decouples loads from the power source during "single phasing." Single phasing usually occurs because of the failure at the input side of the device such as the failure of a leg of a three-phase transformer that supplies the three-phase signal. The opening of a protective fuse associated with a transformer leg on the source side will also appear to the controller as single-phasing. A single-phase detector 556 cooperating with an associated switch 558 may also be included at the load side to protect coupled loads against single-phasing as a result of an operating failure of the controller.

As can be seen in FIG. 11, the switches 548, 558, 547 and 554 are connected in series so as to form a logical AND gate. In other words, a predetermined voltage directly connected to the switch 548 for closing (turning "on") the relays is transmitted to the relays only when all of the switches 548, 558, 547 and 554 are closed (turned "on" or logically high) so as to be indicative of safe operating conditions.

Figure 12:
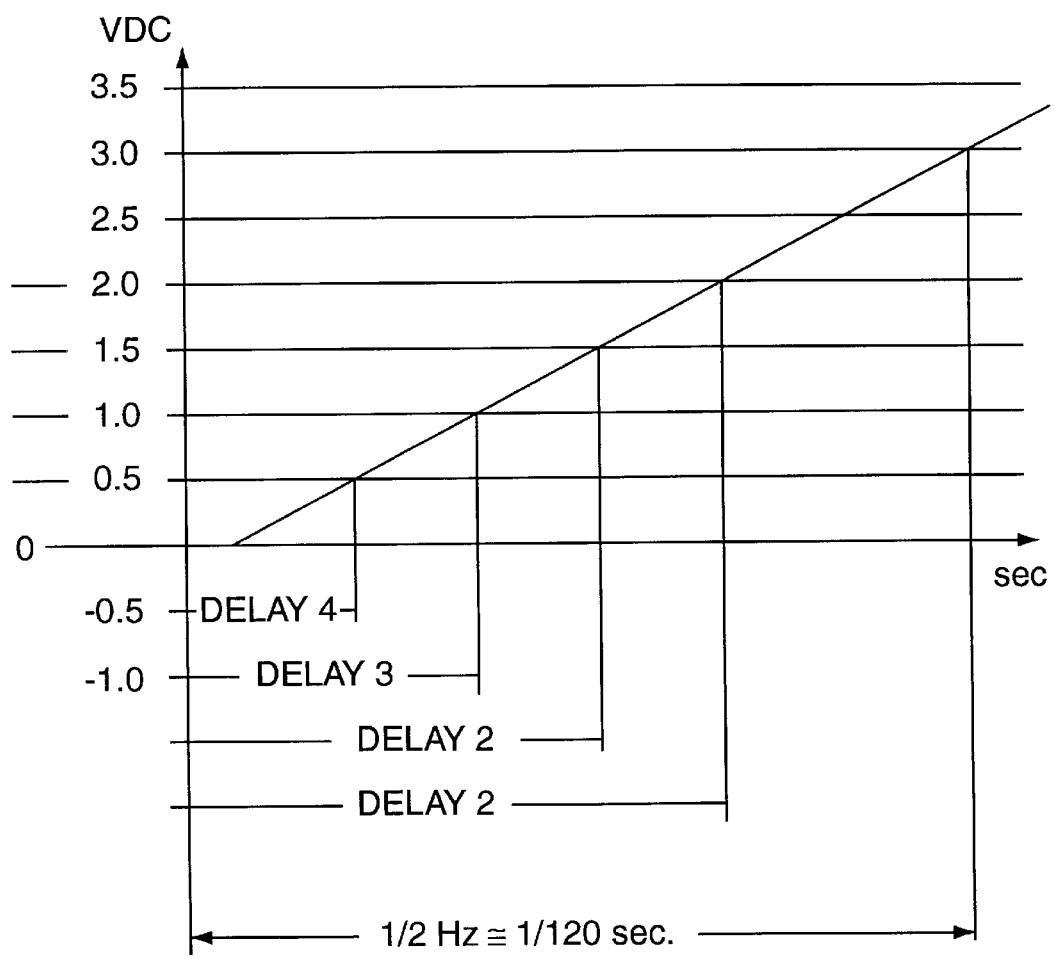
FIG. 12 is a graph illustrating a relationship between the power source signal voltage and the delay in passing power to a coupled load during a half-cycle of the power source signal.

Turning to FIG. 12, the thyristor circuit activation delay in seconds (horizontal axis) from the beginning of a half-cycle of a power source signal for a single phase is graphically illustrated as a function of the differential voltage (vertical axis) supplied to the differential amplifier circuit of the controller of the present invention. At a differential input voltage of zero at 600 indicative of no sag in the power source voltage, there is virtually no delay in thyristor circuit activation such that virtually all of the power from the power source is passed to the load. As the differential voltage supplied to the differential amplifier circuit incrementally increases by a half-voltage from about zero volts at 600 to about 3.5 volts at 612, there is an associated linear increase in the delay of thyristor circuit activation from about zero seconds at 600 to about $\frac{1}{120}$th of a second at 612 such that virtually no power passes to the load at a differential voltage of 3.5.

The present invention described above may be used in several modes. One mode, a soft-start mode, is the control of a load connected directly to a controller embodying the present invention. In this mode a decrease in the power source voltage results in control of the power supplied to the connected load. The decrease in the power source voltage can be caused by the connected load (such as when a motor connected to the controller is started) or from other loads on the line. The cut-in would be set to permit the motor to receive full power until the power source decreases a predetermined amount, for example, 15 volts. Preferably, the sawtooth adjust is set toward the high end of its adjustable range to permit sufficient current to start the motor.

Another mode in which a controller embodying the present invention may be used is the redirection of power to connected loads. For the purpose of illustration, resistive or mixed loads are indirectly connected to a power source, such as a generator, through the controller, and a motor load is directly connected to the generator, the motor being activated in a conventional manner such as by a thermostat or other automatic switch. In this example, the generator or power source can provide for the resistive and mixed loads and the running current for the motor, but not for the resistive and mixed loads and the starting current for the motor. It is in the instance where the source cannot provide for the resistive and mixed loads and the starting current for the motor that the controller of the present invention becomes useful. The cut-in is preferably set to begin control at a power source signal voltage decrease of only a few volts, and the sawtooth adjust is preferably set near the lower end of its adjustable range. When the motor is being started, the controller cuts down on the power to the resistive or mixed loads so that more power is available from the power source for the motor until the motor is fully started. Once fully started, the motor requires a relatively-reduced running current in relation to the starting current such that the controller can safely bring back the resistive or mixed loads to full power. This redirection of power occurs automatically. Without automatic redirection it is possible that a motor start would cause an over current device to engage (or a small generator to stall) which would decouple some or all of the connected loads from the power source until someone resets the over current device, restarts the generator, and gets the loads started in the proper order. The same problem can exist where the loads are supplied through a high impedance source such as a small power line, long extension cord or combination thereof. Of course, a combination of the above-modes of operation may be simultaneously employed.

As will be recognized by those of ordinary skill in the pertinent art, numerous modifications and substitutions may be made to the above-described embodiment of the present invention without departing from the scope of the appended claims. For example, other equivalent means for controlling power to the load in response to source voltage sag may be employed. Accordingly, the preceding portion of this specification is to be taken in an illustrative, as opposed to a limiting sense.

What is claimed is:

1. A controller for use in an electrical circuit connectable to a power source for providing an electrical power source signal having a waveform cycle to a load, the load capable of reducing the voltage magnitude of the power source signal below a predetermined level indicative of a sagged power source, the controller comprising:

means for comparing the voltage magnitude of a received power source signal to the predetermined level indicative of a sagged power source and determining the magnitude of the difference therebetween; and means for decoupling the load from the power source for a progressively increasing portion of each cycle of the power source signal as the voltage magnitude of the power source signal progressively increasingly drops further below the predetermined level indicative of a sagged power source in order to permit the voltage magnitude of the power source signal to rise and recover more quickly to a normal operating voltage level.

2. A control circuit for use in an electrical circuit connectable to an alternating current (AC) power source for providing an electrical AC power source signal having a waveform cycle to a load, the load capable of reducing the voltage magnitude of the power source signal below a predetermined level indicative of a sagged power source, the circuit comprising:

means for receiving a pulsed DC input signal originating from the AC power source signal, the pulsed DC input signal being synchronized with the waveform of the AC power source signal;

means for generating a differential signal having a voltage level indicative of the amount that the voltage magnitude of the received power source signal has dropped below the predetermined level indicative of a sagged power source;

a sawtooth generator for generating a sawtooth signal having a waveform in synchronization with a waveform of the power source signal;

means for comparing the voltage levels of the sawtooth signal with that of the differential signal; and means for coupling the power source to a load during a portion of each cycle of the sawtooth signal when the voltage magnitude of the sawtooth signal has risen to a level equal to or greater than that of the differential signal so that power is progressively and increasingly reduced to the loads as the voltage magnitude of the power source signal progressively decreases with respect to the predetermined level indicative of a sagged power source.

3. A circuit as defined in claim 2, further comprising means for generating a set point voltage that is reduced in magnitude from and represents the predetermined level indicative of a sagged power source, and wherein the input signal voltage is reduced in magnitude from and represents the power source signal voltage, the set point and input voltages to be used by the differential signal means for generating a differential signal.

4. A circuit as defined in claim 2, wherein the period of the sawtooth signal is to be one-half the period of a power source signal.

5. A circuit as defined in claim 2, further including means for averaging a power source signal over several cycles for use by the differential signal means.

6. A circuit as defined in claim 2, further comprising a ramp generator for generating a ramp signal each time the differential signal voltage first becomes positive, the ramp signal voltage quickly rising to and peaking at a maximum voltage level about as high as that of the maximum level of the sawtooth signal when the sawtooth signal is about zero volts, and the voltage level of the ramp signal decaying over a few cycles of the sawtooth signal, wherein the comparing means further comprises means for comparing the higher voltage level of the ramp signal and the differential signal to that of the sawtooth signal, and wherein the coupling means further comprises means for coupling the power source to a load during a portion of a cycle of the sawtooth signal when the sawtooth signal voltage has risen to a level greater than or equal to the higher voltage level of the differential signal and the ramp signal.

7. A circuit as defined in claim 2, wherein the coupling means comprises an optical coupler to couple a load to a power source.

8. A circuit as defined in claim 7, wherein the coupling means further comprises a thyristor to connect a power source to one or more loads, the thyristor including a gate to be triggered by the optical coupler in order to couple a power source to one or more loads.

9. A circuit as defined in claim 8, wherein the thyristor is a triac.

10. A circuit as defined in claim 2, further comprising an on-delay timer for coupling a power source to one or more loads after a predetermined time period has elapsed.

11. A circuit as defined in claim 2, further comprising a brown-out detector and timer for decoupling one or more loads from a power source after a predetermined time period has elapsed.

12. A circuit as defined in claim 2, further comprising an overcurrent circuit for decoupling one or more loads from a power source.

13. A circuit as defined in claim 2, further comprising means for adjusting the slope of the sawtooth signal waveform so as to adjust power received by one or more loads.

14. A method for controlling electrical power from a power source having a power source signal having a waveform cycle to a load, the load capable of reducing the voltage magnitude of the power source signal below a predetermined level indicative of a sagged power source, the controller comprising the steps of:

generating a differential signal having a voltage level indicative of the magnitude of the difference between the voltage magnitude of the power source signal below the predetermined level indicative of a sagged power source; and transmitting a progressively increasingly smaller portion of the cycle of the power source signal to a load as the voltage magnitude of the power source signal progressively and increasingly drops further below the predetermined level indicative of a sagged power source in order to permit the voltage magnitude of the power source signal to more quickly rise and recover to a normal operating voltage level.

15. A method as defined in claim 14, wherein the step of generating comprises:

providing a set point signal having a voltage that is reduced in magnitude from and represents the level indicative of a predetermined sagged power source;

providing an input signal having a voltage that is reduced in magnitude from and represents the voltage magnitude of the received power source signal; and comparing the voltage level of the set point signal to that of the input signal to generate the voltage level of the differential signal.

\* \* \* \* \*